(12) United States Patent
Okamura et al.

(10) Patent No.: US 11,447,187 B2
(45) Date of Patent: Sep. 20, 2022

(54) VEHICLE FRONT STRUCTURE

(71) Applicants: MAZDA MOTOR CORPORATION, Hiroshima (JP); DaikyoNishikawa Corporation, Hiroshima (JP)

(72) Inventors: Kazumi Okamura, Hiroshima (JP); Motoi Aoki, Hiroshima (JP); Yuta Mishima, Hiroshima (JP); Hiroshi Mizuguchi, Hiroshima (JP); Daisuke Ooune, Higashihiroshima (JP); Takashi Yamashita, Higashihiroshima (JP)

(73) Assignees: MAZDA MOTOR CORPORATION, Hiroshima (JP); DaikyoNishikawa Corporation, Hiroshima (JP)

( * ) Notice: Subject to any disclaimer, the term of this patent is extended or adjusted under 35 U.S.C. 154(b) by 101 days.

(21) Appl. No.: 17/056,343

(22) PCT Filed: May 24, 2019

(86) PCT No.: PCT/JP2019/020735
§ 371 (c)(1),
(2) Date: Nov. 17, 2020

(87) PCT Pub. No.: WO2019/230606
PCT Pub. Date: Dec. 5, 2019

(65) Prior Publication Data
US 2021/0214014 A1    Jul. 15, 2021

(30) Foreign Application Priority Data
May 30, 2018    (JP) ............................. JP2018-103202

(51) Int. Cl.
*B62D 25/08*    (2006.01)
*B60R 13/08*    (2006.01)
(Continued)

(52) U.S. Cl.
CPC ........ *B62D 25/082* (2013.01); *B60R 13/0838* (2013.01); *B62D 25/10* (2013.01); *B62D 29/041* (2013.01)

(58) Field of Classification Search
CPC .... B62D 25/082; B62D 25/10; B62D 29/041; B62D 25/12; B62D 25/105; B60R 13/0838; F02B 77/11; F02B 77/13
(Continued)

(56) References Cited

U.S. PATENT DOCUMENTS 10,625,707 B2 * 4/2020 Hammer ................. B62D 25/12
10,889,331 B2 * 1/2021 Asai ......................... B32B 27/40
(Continued)

FOREIGN PATENT DOCUMENTS

JP    S59-067329 U    5/1984
JP    2015-209771 A    11/2015
(Continued)

OTHER PUBLICATIONS

International Search Report issued in PCT/JP2019/020735; dated Jul. 30, 2019.

*Primary Examiner* — Pinel E Romain
(74) *Attorney, Agent, or Firm* — Studebaker & Brackett PC

(57) ABSTRACT

A vehicle front structure includes, below a bonnet (6), a cover member (1) that covers an engine from an upper portion thereof to the side and is formed by an upper wall (30), a shroud (8) as a front wall, a rear wall (13), and side walls (11, 12) on the respective left and right sides. The cover member is formed by the upper wall, the front wall, the rear wall, and the side walls on the respective left and right sides. The front side of one of the left and right side walls is configured to have, relative to the rear side, a higher ratio of a low-rigidity member having lower rigidity than a (Continued)

high-rigidity member forming a main portion on the rear side.

9 Claims, 8 Drawing Sheets

(51) Int. Cl.
*B62D 25/10* (2006.01)
*B62D 29/04* (2006.01)

(58) Field of Classification Search
USPC .................................................. 296/193.11
See application file for complete search history.

(56) References Cited

U.S. PATENT DOCUMENTS

| 2018/0244216 | A1  | 8/2018 | Hoshino et al. |
| 2019/0048779 | A1* | 2/2019 | Hoshino ................ F01P 11/10 |
| 2021/0183350 | A1* | 6/2021 | Fukui .................. B60R 13/0815 |
| 2021/0253178 | A1* | 8/2021 | Bouta .................. B62D 25/082 |

FOREIGN PATENT DOCUMENTS

| JP | 2017-177966 A   | 10/2017 |
| WO | 2017/169529 A1  | 10/2017 |

* cited by examiner

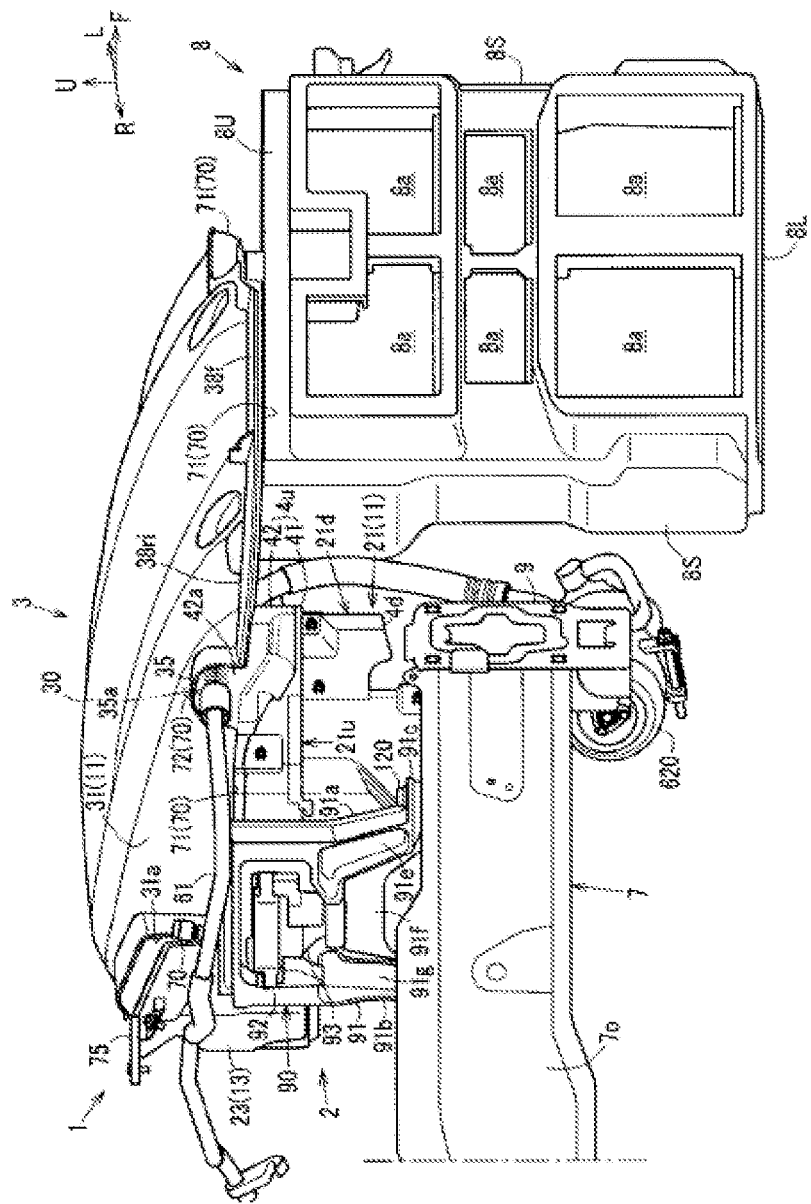
[Fig. 1]

[Fig. 2]
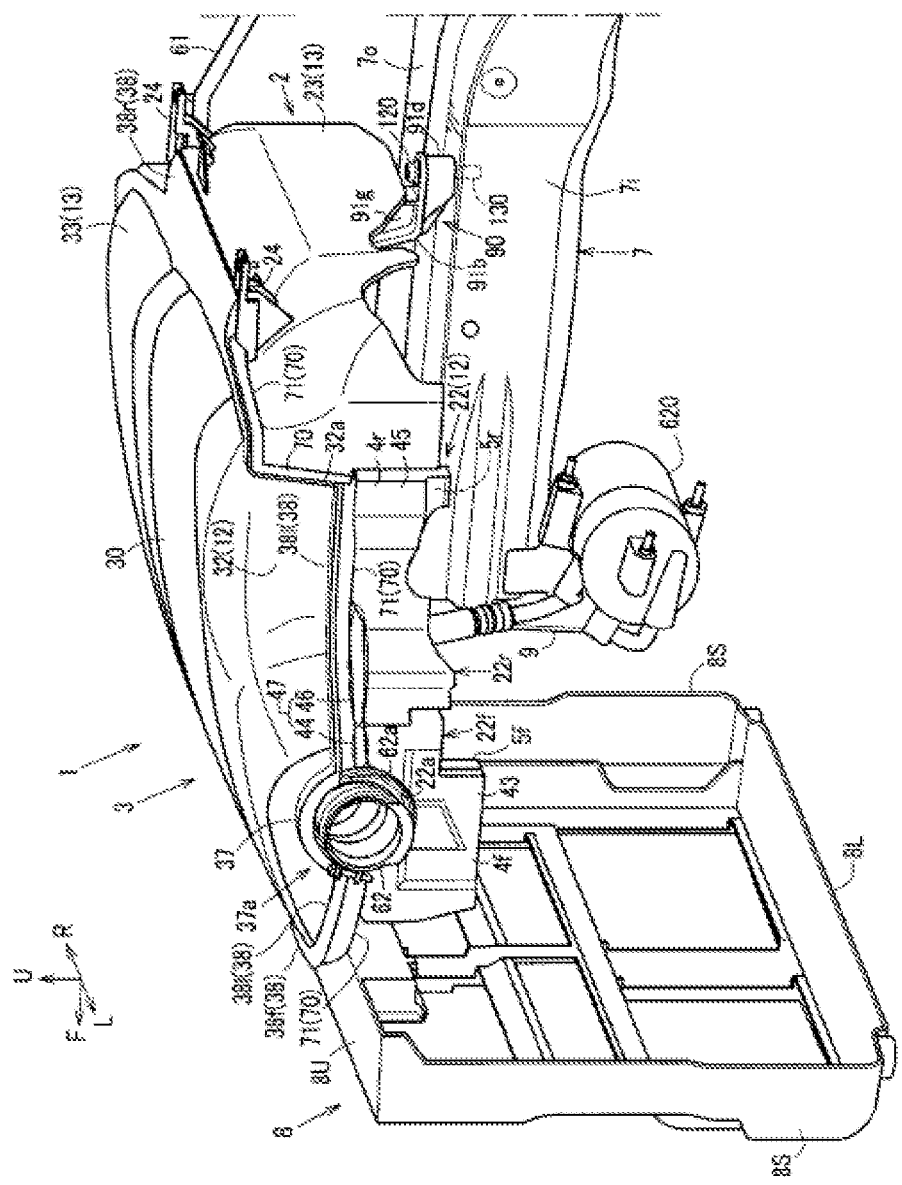

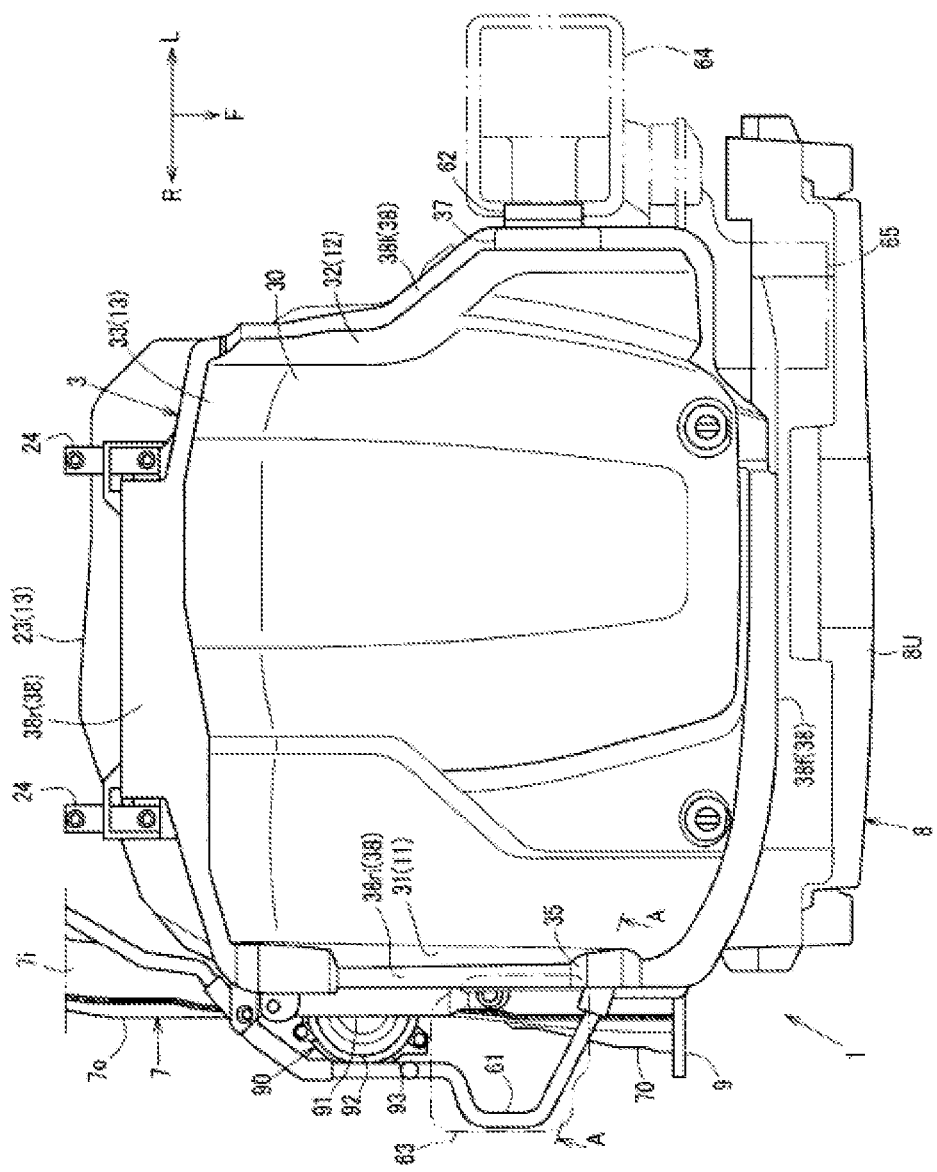
[Fig. 3]

[Fig.4]
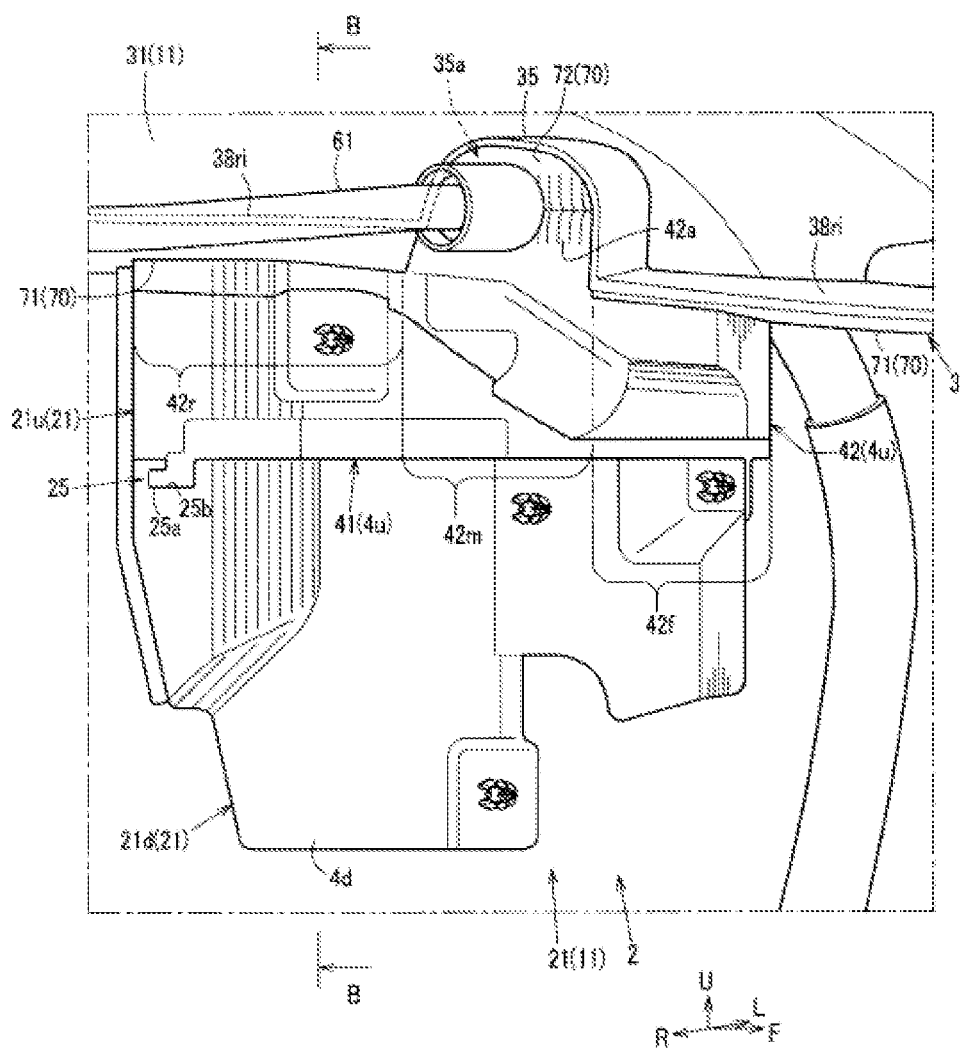

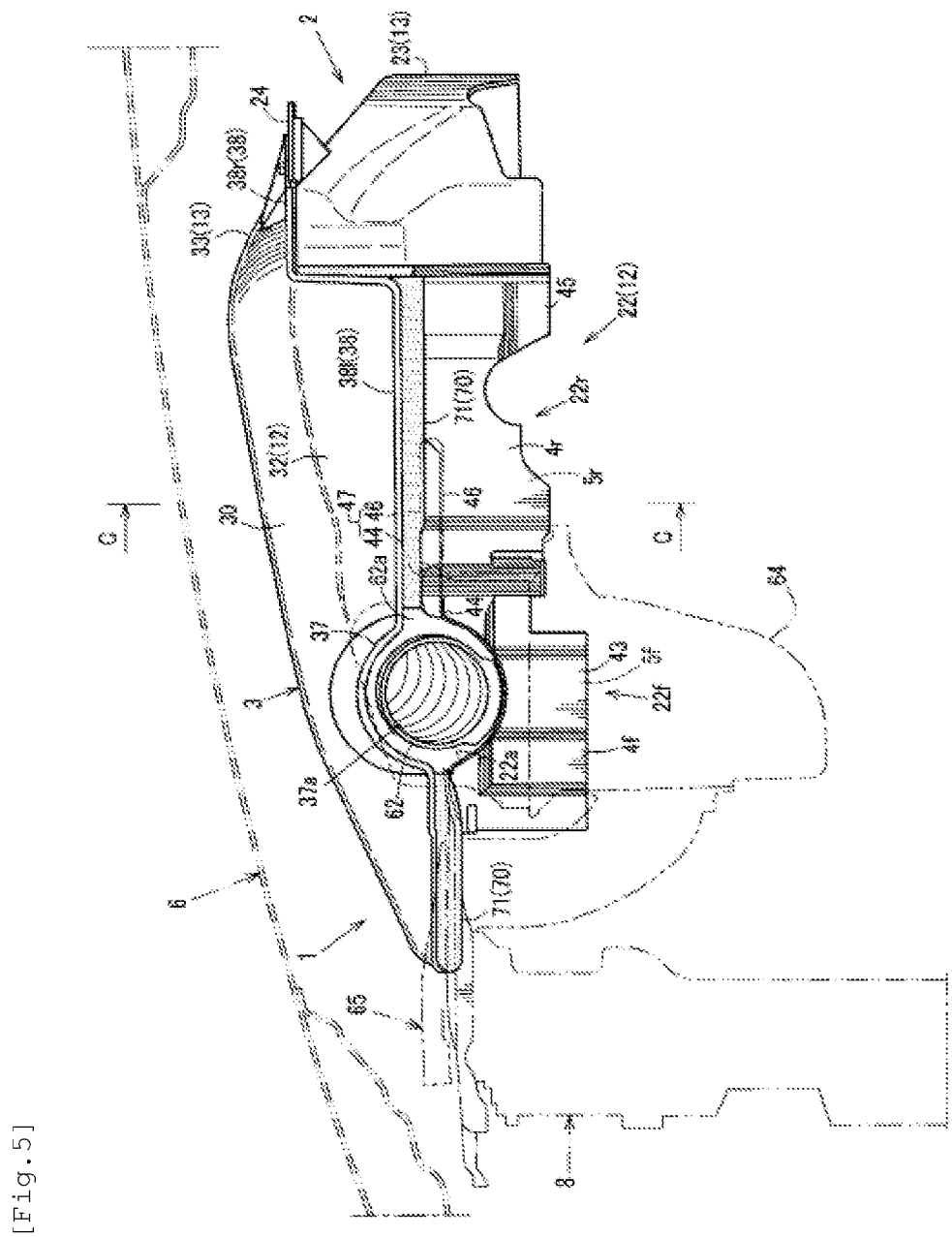
[Fig. 5]

[Fig.6]
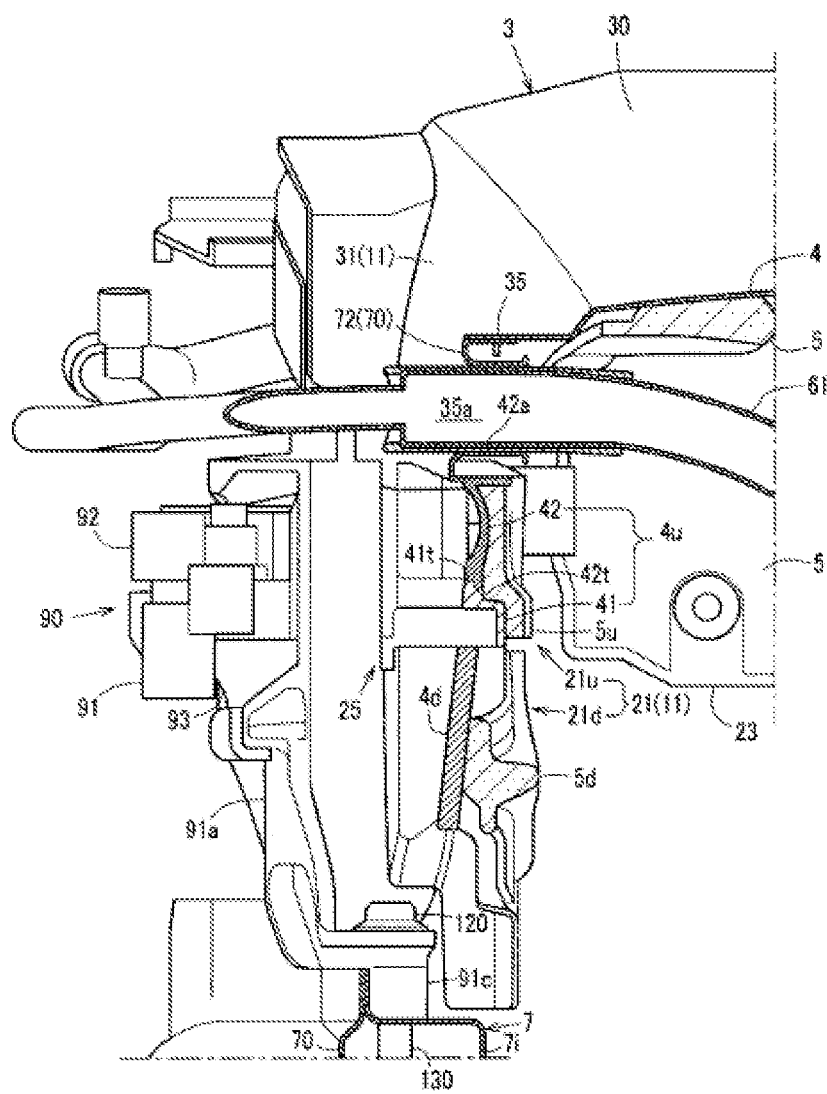

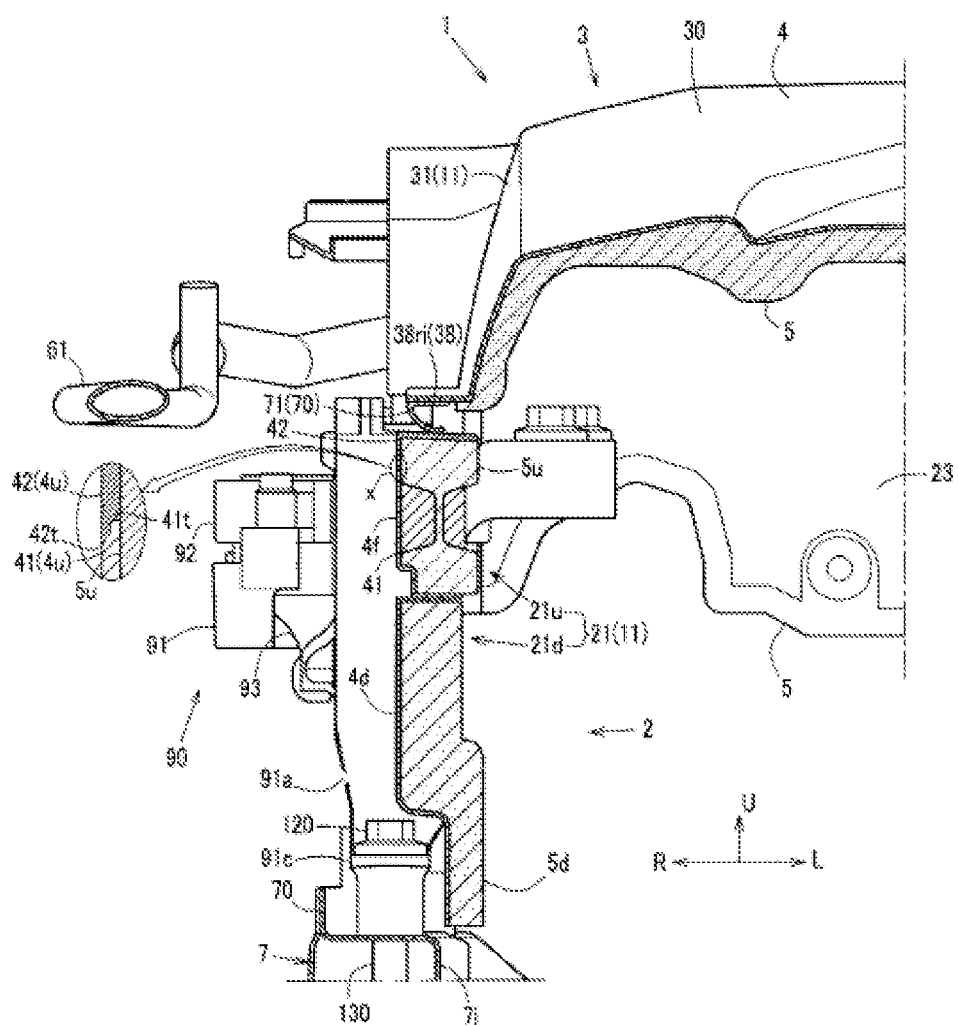
[Fig.7]

[Fig.8]
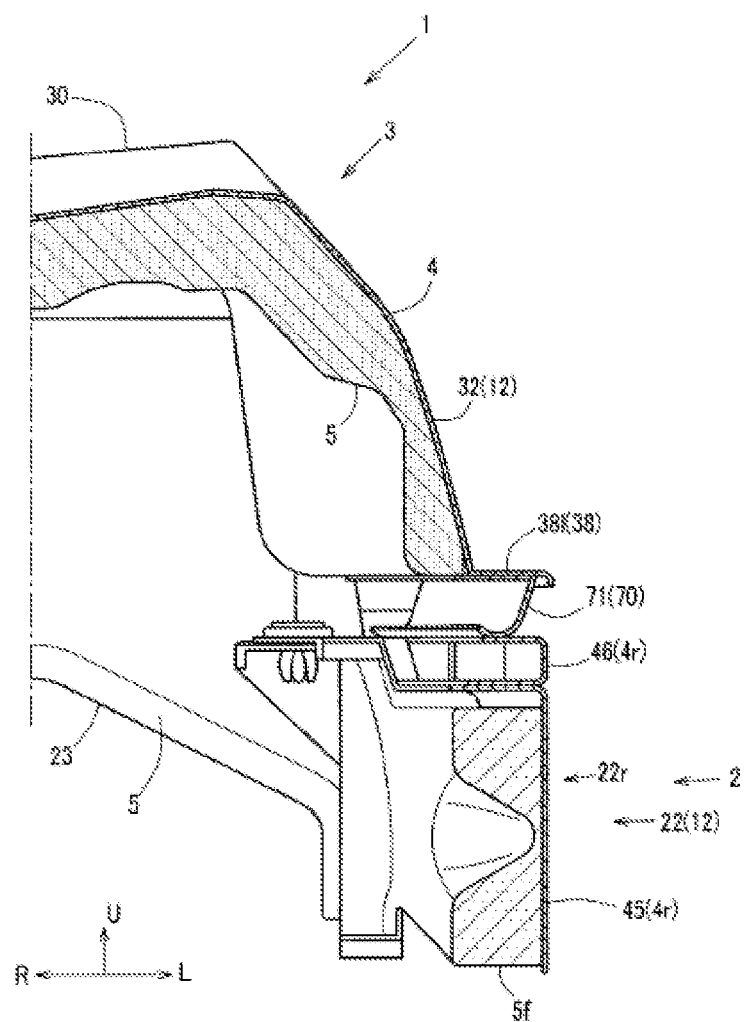

VEHICLE FRONT STRUCTURE

TECHNICAL FIELD

The technology disclosed herein relates to a vehicle front structure including, below a bonnet, a cover member that covers an engine from an upper portion thereof to a side peripheral face thereof and is formed by an upper wall, a front wall, a rear wall, and side walls on the respective left and right sides.

BACKGROUND ART

A structure has been known in which, for the purpose of, for example, warming-up advancement at the time of the next operation of an engine, a cover member covers the engine from the top face to the side peripheral face for retaining heat of the engine (see, for example, Patent Literature 1).

Meanwhile, at the time of collision between a vehicle and a pedestrian, for protecting the pedestrian by suppressing an increase in the injury value with respect to the pedestrian due to running out of shock absorption of the bonnet, it is important to have an enhanced shock absorption performance on the bonnet on which the pedestrian collapses.

In order to enhance the shock absorption of the bonnet, it is effective to secure a sufficient height of the side wall of the cover member. However, bonnets are typically formed to have a lower height toward the front side, and accordingly the height of the side wall of the cover member is also low.

CITATION LIST

Patent Literature

Patent Literature 1: Japanese Patent Laid-Open No. 2017-177966

SUMMARY OF INVENTION

Technical Problem

The technology disclosed herein improves a shock absorption performance of a front portion of a bonnet.

Solution to Problem

The technology disclosed herein relates to a vehicle front structure including, below a bonnet, a cover member that covers an engine from an upper portion of the engine to a side peripheral face of the engine and is formed by an upper wall, a front wall, a rear wall, and side walls on respective left and right sides. In this structure, a front side of at least one of the left and right side walls is configured to have, relative to a rear side of the at least one of the left and right side walls, a higher ratio of a low-rigidity member having lower rigidity than a high-rigidity member forming a main portion on the rear side.

According to the configuration, a shock absorption performance of a front portion of the bonnet can be improved.

The cover member may include an openable and closable opening-closing cover having the upper wall, opening-closing side walls on respective left and right sides, and an opening-closing rear wall; the side walls on the respective left and right sides may be formed by the opening-closing side walls on the respective left and right sides and fixed walls on respective left and right sides, upper ends of the fixed walls supporting lower ends of the opening-closing side walls on the respective left and right sides via a seal member; the rear wall may be formed by the opening-closing rear wall and a fixed rear wall rotatably supporting the opening-closing rear wall via a hinge; and a front portion of each fixed side wall may be formed by the high-rigidity member and the low-rigidity member provided on an upper side relative to the high-rigidity member.

According to the configuration, the shock absorption performance of the front portion of the bonnet can be improved while securing rigidity of the opening-closing cover.

The high-rigidity member may be formed of a PP material, and the low-rigidity member may be formed of an elastomer resin material having lower rigidity than the PP material; and a main portion of the side wall may be formed by the high-rigidity member, and a front portion of the side wall may be configured so as to have a higher ratio of the low-rigidity member than a rear portion of the side wall.

According to the configuration, while basic rigidity of the side wall is secured by the PP material, rigidity of the front portion of the side wall can be partially reduced by the elastomer resin material.

The side wall may be formed by integrating the high-rigidity member and the low-rigidity member.

According to the configuration, the number of components and the number of assembling steps can be reduced.

A thermal insulating member may be mounted on an inner wall face side of the side wall.

According to the configuration, the thermal insulating member can be mounted on the inner wall face side of the side wall without a gap.

An upper portion of the side wall may be provided with a first through portion allowing a vehicle component having higher rigidity than the low-rigidity member to be inserted through the first through portion, and a lower side of the first through portion in the side wall may have a higher ratio of the low-rigidity member than another portion.

According to the configuration, routing of the vehicle component having high rigidity between an inside and outside of the cover member and the shock absorption performance of the front portion of the bonnet can be both achieved.

An upper portion of the side wall may be provided with a second through portion allowing a vehicle component having lower rigidity than the high-rigidity member to be inserted through the second through portion, and the vehicle component inserted through the second through portion may be configured to substitute for the low-rigidity member.

According to the configuration, the shock absorption performance of the front portion of the bonnet can be improved by using the vehicle component inserted through the second through portion.

The vehicle component inserted through the second through portion may be an air intake hose in a bellows shape.

According to the configuration, the shock absorption performance of the front portion of the bonnet can be improved by using the air intake hose in a bellows and hollow shape.

Advantageous Effect of Invention

The vehicle front structure can improve the shock absorption performance of the front portion of the bonnet.

BRIEF DESCRIPTION OF DRAWINGS

FIG. 1 is a perspective view of a main portion of a vehicle front structure when viewed from the vehicle front and right side.

FIG. 2 is a perspective view of the main portion of the vehicle front structure when viewed from the vehicle rear and left side.

FIG. 3 is a plan view of the vehicle front structure.

FIG. 4 is an enlarged view of the main portion in FIG. 1.

FIG. 5 is a side view showing the main portion of the vehicle front structure when viewed from the vehicle left side.

FIG. 6 is a cross-sectional view taken along line A-A in FIG. 3.

FIG. 7 is a cross-sectional view taken along line B-B in FIG. 4.

FIG. 8 is a cross-sectional view taken along line C-C in FIG. 5.

DESCRIPTION OF EMBODIMENT

A vehicle front structure will be hereinafter described in detail based on the drawings. In the figures, arrow F indicates the vehicle front side; arrow R, the vehicle right side; arrow L, the vehicle left side; and arrow U, the vehicle upper side.

FIGS. 1 to 3 show the vehicle front structure including a thermal insulating structure of an engine, and the vehicle front structure will be explained first prior to explanation of the thermal insulating structure of the engine.

As shown in FIGS. 1 to 3, a shroud 8 is provided on the above-described vehicle front side of an engine room (see FIG. 2).

As shown in FIGS. 1 and 2, the above-described shroud 8 is formed by integrating an upper member 8U, a lower member 8L, and left and right side members 8S connecting these upper and lower members 8U and 8L in the up-down direction, in a substantially square frame shape so as to cover a radiator as a heat exchanger and a capacitor.

The shroud 8 is provided with an opening 8a passing therethrough in the vehicle front-rear direction between the members 8U and 8L and between the members 8S (see FIG. 1) and includes a shutter (illustration omitted) that fills the opening 8a in an openable and closable manner. The shutter closes the opening 8a, and thereby the shroud 8 is formed as a front wall of a cover member 1 described later.

Furthermore, above the engine room of the front portion of the vehicle, a bonnet 6 that covers the engine room in an openable and closable manner is disposed (see FIG. 5), and this bonnet 6 extends so as to be moderately inclined downward as it goes forward.

As shown in FIGS. 1 to 3, there are provided front side frames 7 (only the vehicle right side illustrated) extending toward the vehicle front side from a dash lower panel (dash panel) (illustration omitted) on both left and right sides of the engine room.

This front side frame 7 is a vehicle body strengthening member which has a front side frame inner 7i and a front side frame outer 7o which are fixedly joined together and includes a closed cross-section extending in the vehicle front-rear direction, and a front end portion of the front side frame 7 is provided with a set plate 9 for mounting of a crash can.

As shown in FIG. 2, the front side frame inner 7i of the front side frame 7 on the vehicle right side supports an engine mount bracket 90 from the lower side.

As shown in FIG. 1, this engine mount bracket 90 includes a body-side bracket 91, an engine-side bracket 92, and a mount rubber 93 provided between both brackets 91 and 92.

As shown in FIG. 1, the body-side bracket 91 includes front and rear leg portions 91a and 91b, mounting seats 91c and 91d as mounting portions integrally formed on lower ends of these front and rear leg portions 91a and 91b (see FIGS. 1 and 2), and raised walls 91e, 91f, and 91g filling between the mounting seats 91c and 91d which are between the mounting portions at front and rear two positions.

The front and rear mounting seats 91c and 91d of the above-described body-side bracket 91 are fastened to a top face of the front side frame inner 7i by using a bolt 120 and a nut member 130 (see FIGS. 2 and 7).

The above-described body-side bracket 91 and engine-side bracket 92 are both formed by aluminum die casting.

Next, the thermal insulating structure of the engine which is provided in the vehicle front structure will be described in detail with reference to FIGS. 4 to 8, in addition to FIGS. 1 to 3. Note that illustration of the engine mount bracket 90 is omitted in FIG. 4.

As shown in FIGS. 1 to 3, the lower side of the bonnet 6 includes the cover member 1 as the thermal insulating structure of the engine which covers the engine from an upper portion thereof to the side.

The cover member 1 includes a cover body 2 and a lid 3 that is attached to the cover body 2 in an openable and closable manner and covers the engine.

The cover body 2 includes a cover body right-side wall 21 and a cover body left-side wall 22 which cover the sides of the engine on the respective vehicle left and right sides, a cover body rear wall 23 that covers the rear side of the engine, and the shroud 8 as the front wall.

The lid 3 includes an upper wall 30, a lid right-side wall 31 and a lid left-side wall 32 which cover side upper portions of the engine on the respective vehicle left and right sides, and a lid rear wall 33 that covers a rear upper portion of the engine.

The lid right-side wall 31, the lid left-side wall 32, and the lid rear wall 33 extend downward from a right edge, left edge, and rear edge of the upper wall 30, respectively. The upper wall 30 is formed so that a top face thereof is, corresponding to the shape of the bonnet 6, moderately inclined so as to become gradually lower from a rear portion thereof toward the front side, and correspondingly the lid right-side wall 31 and the lid left-side wall 32 are both formed so as to have a smaller up-down width toward the front side (the length in the up-down direction) (see FIGS. 1, 2, and 5).

A lower end peripheral edge of the lid 3, namely, a front edge of the upper wall 30 and each of lower edges of the lid rear wall 33, the lid right-side wall 31, and the lid left-side wall 32 are formed integrally with a flange 38 (38f, 38ri, 38l, 38r) extending outward in a plan view from these lower ends (see FIG. 3).

Here, a right-side wall 11, a left-side wall 12, and a rear wall 13 are all formed in a raised wall shape by the lid right-side wall 31 and the cover body right-side wall 21 as shown in FIGS. 1, 4, 6, and 7, the lid left-side wall 32 and the cover body left-side wall 22 as shown in FIGS. 2, 5, and 8, and the lid rear wall 33 and the cover body rear wall 23 as shown in FIGS. 2 and 5, respectively.

The above-described cover body 2 and lid 3 both include an outer cover member 4 (for example, 4u, 4d, 4f, 4r) made of synthetic resin, and a thermal insulating member 5 (for example, 5u, 5d, 5f, 5r) integrally disposed at an inner face of the outer cover member 4 (see FIGS. 6 to 8).

The thermal insulating member 5 is formed of, for example, a glass wool material or a urethane material so as to have a sound absorbing effect in addition to a thermal insulating effect and mounted by a clip or the like on an appropriate portion of the inner face of the outer cover member 4 at which the thermal insulating member 5 is disposed.

As shown in FIGS. 1, 3, and 4, a front portion of the lid right-side wall 31 is formed integrally with a guide portion 35 in a semi-cylindrical shape which extends toward the vehicle-width-direction outer side and projects upward with respect to the flange 38*ri*.

A space surrounded by the guide portion 35 is formed as a first through portion 35*a* which is open downward, passes through the right-side wall 11 in the vehicle width direction, and allows insertion of a metal pipe 61.

The metal pipe 61 is a coolant pipe connecting a compressor 620 (see FIGS. 1 and 2) for coolant compression which is disposed within the cover member 1 so as to work due to driving of the engine, and an evaporator (illustration omitted) of an air conditioning device provided on the vehicle cabin side, and has higher rigidity than a high-rigidity portion 41 and the outer cover member 4*d* (see FIGS. 4 and 7) which form a main portion of the cover body right-side wall 21 and are formed of a PP material described later.

Furthermore, as shown in FIGS. 2, 3, and 5, a front portion of the lid left-side wall 32 is also formed integrally with a guide portion 37 in a semi-cylindrical shape which extends toward the vehicle-width-direction outer side and projects upward with respect to the flange 38*l*.

A space surrounded by the guide portion 37 is formed as a second through portion 37*a* which is open downward, passes through the left-side wall 12 in the vehicle width direction, and allows insertion of an air intake hose 62 in a bellows shape.

As shown in FIG. 3, the air intake hose 62 connects an air cleaner 64 disposed outside the cover member 1 and an intake manifold (illustration omitted) disposed inside the cover member 1 and provided on the engine side, forming an air intake passage between these.

The air intake hose 62 is formed in a hollow and bellows shape by an elastic (flexible) material such as rubber and has lower rigidity than high-rigidity portions 43 and 45 (see FIG. 5) which form a main portion of the cover body left-side wall 22 and are formed of a PP material described later.

As shown in FIGS. 1 and 2, a peripheral edge of the lid 3, namely, for example, a bottom face of the flange 38 provided at a lower edge portion of the lid 3, a lower portion of the guide portion 35 for metal pipe insertion, and rear edge sides 31*a* and 32*a* extending in the up-down direction of the lid side walls 31 and 32 on the respective left and right sides, includes a seal member 70 (71, 72) formed of a rubber member. Here, the seal member 71 provided at the bottom face of the flange 38 provided at the lower edge portion of the lid 3 is mounted in a tongue shape downward. Furthermore, as shown in FIGS. 1 and 4, the seal member 72 mounted on a bottom face (inner face) of the guide portion 35 for metal pipe insertion is disposed so as to constitute an upper half of the first through portion 35*a*.

The lid 3 is pivotably attached in an openable and closable manner, via a pair of left and right hinges 24 (see FIG. 2) disposed from an upper end of the cover body rear wall 23 so as to be spaced apart from each other in the vehicle width direction.

When the lid 3 is closed, the lid rear wall 33 is elastically supported by the cover body rear wall 23 via the seal member 71 provided between these (see FIG. 2). Furthermore, a front edge of the lid 3 is, in a state of being placed on a top face of the shroud 8, elastically supported via the seal member 71 provided between these (see FIG. 1), the lid right-side wall 31 is elastically supported by the engine mount bracket 90 and the cover body right-side wall 21 via the seal member 71 provided between these (see FIG. 1), and the lid left-side wall 32 is elastically supported by the cover body left-side wall 22 via the seal member 71 provided between these (see FIG. 2).

In particular, as described above, when the lid 3 is closed, for example, so that the seal member 71 provided at the flange 38 is pressed against each of upper ends of the cover body side walls 21 and 22 on the respective left and right sides, the lid side walls 31 and 32 on the respective left and right sides are supported from immediately the lower side by these cover body side walls 21 and 22 on the respective left and right sides, and thereby the cover member 1, while enhancing rigidity for supporting the lid 3 by the cover body 2, enhances sealing properties between the lid 3 and the cover body 2 by using a pressing force to the cover body 2 side via the seal member 71 due to the self-weight of the lid 3.

Next, the cover body right-side wall 21 will be described in detail mainly with reference to FIGS. 1, 4, 6, and 7.

The cover body right-side wall 21 is not disposed so as to cover the whole right side of the engine (the side of the engine on the vehicle right side) and is disposed at a region corresponding to substantially a front half of the right side of the engine in the vehicle front-rear direction.

Namely, at a region corresponding to substantially a rear half of the right side of the engine, the engine mount bracket 90 is disposed. This engine mount bracket 90 fills a region between a front edge side of the rear wall 13 on the right side and a rear edge side of the cover body right-side wall 21, substituting for the cover member 1. This leads to such configuration that the cover body right-side wall 21 is made compact to reduce its weight and cost.

The cover body right-side wall 21 is formed in a panel shape forming a raised wall by disposing a right-side wall upper portion 21*u* and a right-side wall lower portion 21*d* on the respective upper and lower sides. The cover body right-side wall 21 is thus not integrally formed by one panel or the like in the up-down direction and has a divided structure including the right-side wall upper portion 21*u* and the right-side wall lower portion 21*d*, so that, of the upper and lower sides 21*u* and 21*d* of the cover body right-side wall 21, only either wall can be removed as necessary, enhancing serviceability (workability such as maintenance) within the cover member 1 compared with a configuration in which the whole cover body right-side wall 21 is removed.

A lower end of the right-side wall upper portion 21*u* and an upper end of the right-side wall lower portion 21*d* are both horizontally formed over substantially the whole vehicle front-rear direction, and a lower end portion of the right-side wall upper portion 21*u* is supported from immediately therebelow by an upper end portion of the right-side wall lower portion 21*d* (see FIG. 7). The right-side wall upper portion 21*u* and the right-side wall lower portion 21*d* are thereby, in a state of being disposed on the respective upper and lower sides substantially without a gap, coupled to each other by using a clip and an engagement structure 25 (see FIG. 4).

As shown in FIG. 4, the engagement structure 25 is formed by a protrusion 25*a* projecting in a tongue shape toward the right-side wall lower portion 21*d* from a rear portion of the lower end of the right-side wall upper portion 21*u* which horizontally extends in the vehicle front-rear direction, and a groove 25*b* which is formed at the upper end of the right-side wall lower portion 21*d* which horizontally extends in the vehicle front-rear direction and forms a portion corresponding to the protrusion 25a on the lower side in a recess shape, and the protrusion 25a is engaged with the groove 25b in a state where the right-side wall upper portion 21u and the right-side wall lower portion 21d are integrally formed in a panel shape.

The cover body right-side wall 21 includes, corresponding to the right-side wall upper portion 21u and the right-side wall lower portion 21d, the outer cover members 4u and 4d (see FIGS. 1, 4, 6, and 7), and the thermal insulating members 5u and 5d (see FIGS. 6 and 7) integrally disposed at inner faces of these outer cover members 4u and 4d, respectively.

The whole outer cover member 4d of the right-side wall lower portion 21d is formed of a PP material as a high-rigidity member, and the inner face of the outer cover member 4d includes the thermal insulating member 5d formed of a member different from that of the thermal insulating member 5u provided at the right-side wall upper portion 21u (see FIGS. 6 and 7).

Furthermore, as shown in FIGS. 1, 4, 6, and 7, the outer cover member 4u of the right-side wall upper portion 21u is formed in a raised wall shape by integrating the high-rigidity portion 41 and a low-rigidity portion 42 located on the upper side relative to the high-rigidity portion 41.

Here, in this example, the high-rigidity portion 41 is formed of a PP material similarly to the outer cover member 4d of the right-side wall lower portion 21d, and the low-rigidity portion 42 is formed of an elastomer resin material as a low-rigidity member having lower rigidity than the PP member.

Although in the cover member 1, other than the cover body right-side wall 21, the outer cover member 4 is formed of a PP material as appropriate, for example, portions such as the cover body rear wall 23 and the lid rear wall 33 in which there is a concern about an effect of heat damage from exhaust system components (illustration omitted) such as an exhaust manifold and a catalyst device may contain glass fiber as necessary.

The outer cover member 4u of the right-side wall upper portion 21u is formed by integrating the high-rigidity portion 41 and the low-rigidity portion 42 as described above, and thereby, between the high-rigidity portion 41 and the low-rigidity portion 42, without, for example, a connecting structure for connecting the two or a gap intervening between both portions 41 and 42, at least the inner faces (faces on the side facing to the engine) of both members can be formed flat so as to be continuous in the up-down direction (see FIGS. 6 and 7, in particular, an X portion enlarged portion in FIG. 7).

Accordingly, the outer cover member 4u of the right-side wall upper portion 21u is formed by integrating the high-rigidity portion 41 and the low-rigidity portion 42 as described above, and thereby the thermal insulating member 5u is not separately formed corresponding to the high-rigidity portion 41 and low-rigidity portion 42 of the right-side wall upper portion 21u (see FIGS. 6 and 7), so that the thermal insulating member 5u continuously integrally formed over substantially the whole right-side wall upper portion 21u can be disposed at the inner face of the outer cover member 4u of the right-side wall upper portion 21u so as to lie across the high-rigidity portion 41 and the low-rigidity portion 42 (boundary portion) (see the same figures).

As shown in the X portion enlarged portion in FIG. 7, a lower end portion of the low-rigidity portion 42 and an upper end portion of the high-rigidity portion 41 are respectively provided with stepped portions 42t and 41t projecting toward the counterparts so as to be alternately disposed in the vehicle width direction, and thereby, in a state where the low-rigidity portion 42 and the high-rigidity portion 41 are disposed on the respective upper and lower sides, the stepped portions 42t and 41t thereof engage with each other, suppressing the displacement in the vehicle width direction.

As shown in FIGS. 1 and 4, the high-rigidity portion 41, at a lower portion of the outer cover member 4u of the right-side wall upper portion 21u, and the low-rigidity portion 42, at an upper portion of the outer cover member 4u of the right-side wall upper portion 21u, are each formed over the whole vehicle front-rear direction of the right-side wall upper portion 21u.

Namely, at at least a lower end portion of the outer cover member 4u of the right-side wall upper portion 21u in the up-down direction, over the whole vehicle front-rear direction thereof, the high-rigidity portion 41 is formed, and, at an upper end portion of the outer cover member 4u of the right-side wall upper portion 21u, the low-rigidity portion 42 is formed over the whole vehicle front-rear direction of the right-side wall upper portion 21u.

By the configuration, the cover body right-side wall 21 is formed in a panel shape forming a raised wall, and the outer cover member 4 (4u, 4d) of the cover body right-side wall 21, while substantially the whole thereof (specifically, portions corresponding to the high-rigidity portion 41 of the right-side wall upper portion 21u and the outer cover member 4d of the right-side wall lower portion 21d) is formed of a PP material as a high-rigidity member, is formed of an elastomer resin material as a low-rigidity member over the whole vehicle front-rear direction at an upper end portion of the cover body right-side wall 21.

In particular, the right-side wall 11 (cover body right-side wall 21) is configured so as to have, in the vehicle front-rear direction thereof, an occupancy of the low-rigidity portion 42 which is higher on the front side of the right-side wall 11 than on the rear side thereof.

Specifically, as shown in FIG. 4, at at least the upper end portion of the cover body right-side wall 21 in the up-down direction, the low-rigidity portion 42 extending along the vehicle front-rear direction is formed by integrating a small width portion 42r, a first widened portion 42m, and a second widened portion 42f in this order from a rear end of the cover body right-side wall 21 to a front end thereof.

The small width portion 42r extends along an upper end portion of the right-side wall 11 from a rear end of the right-side wall 11 to a position before a rear edge of the guide portion 35 for metal pipe insertion and, over the vehicle front-rear direction thereof, has substantially the same up-down width (the length in the up-down direction) as the tongue-shaped seal member 71 mounted along a bottom face of the flange 38ri of the lower edge of the lid right-side wall 31.

The first widened portion 42m extends along the vehicle front-rear direction from the rear edge of the guide portion 35 to a front edge thereof. Namely, this first widened portion 42m is disposed immediately below the guide portion 35. A lower end portion of the first widened portion 42m extends in an inclined shape downward as it goes toward the vehicle front side.

The first widened portion 42m thereby has an up-down width which is gradually longer toward the vehicle front side from a rear end portion thereof which has substantially the same up-down width as the small width portion 42r disposed along an upper end portion of the right-side wall upper portion 21*u*, and a front end thereof is widened up to an up-down width excluding a lower portion of the right-side wall upper portion 21*u*.

An upper end of the first widened portion 42*m* is formed integrally with a low-rigidity upper extending portion 42*a* extending until a region corresponding to substantially a lower half of an inner region surrounded by the guide portion 35 as viewed from the vehicle right side (first through portion 35*a*) is reached (see FIG. 4).

The metal pipe 61 inserted through the first through portion 35*a* is elastically supported so as to be interposed from both upper and lower sides between the low-rigidity upper extending portion 42*a* and the seal member 72 provided at substantially an upper half of the first through portion 35*a* (see FIGS. 4 and 6).

The second widened portion 42*f*, while maintaining the up-down width of the front end of the first widened portion 42*m*, namely, the up-down width excluding the lower portion of the right-side wall upper portion 21*u*, extends forward from the front end of the first widened portion 42*m* to a front end of the right-side wall upper portion 21*u*.

As described above, in the cover body right-side wall 21, in the vehicle front-rear direction thereof, a rear portion provided with the small width portion 42*r* is disposed rearward with respect to the first through portion 35*a*, an intermediate portion provided with the first widened portion 42*m* is disposed immediately below the first through portion 35*a*, and further a front portion provided with the second widened portion 42*f* is disposed forward with respect to the first through portion 35*a*. The cover body right-side wall 21 is thereby configured so as to have the higher occupancy of the low-rigidity portion 42 (low-rigidity member) on the front side than on the rear side.

Furthermore, in the cover body right-side wall 21, as described above, in the vehicle front-rear direction thereof, in particular, the intermediate portion includes the first widened portion 42*m* having a greater up-down width than the small width portion 42*r* provided at the rear portion (including the low-rigidity upper extending portion 42*a*), and thereby the intermediate portion located immediately below the first through portion 35*a* is configured to have an increased ratio of the low-rigidity portion 42 compared with the rear portion located rearward with respect to the first through portion 35*a*, namely, is configured to be easily bent in the up-down direction.

The metal pipe 61 having high rigidity is thus inserted through the first through portion 35*a*, and thereby it is configured to secure shock absorption at this portion in which there is a concern that the shock absorption performance from above the bonnet 6 may deteriorate.

Furthermore, as shown in FIG. 3, a sub-tank 63 is disposed adjacent to the rear side of the cover body right-side wall 21 and the vehicle right side.

The sub-tank 63 is connected to the radiator, not illustrated, via a pipe, and, while an overflow due to a temperature increase of cooling water in the radiator flows in and is stored, when the cooling water in the radiator is lost due to evaporation or the like, the sub-tank 63 returns the stored cooling water to the radiator side, maintaining a predetermined amount of the cooling water in the radiator.

In the cover body right-side wall 21, at least the right-side wall lower portion 21*d* thereof is mounted on the radiator sub-tank 63, and the cover body right-side wall 21 is supported from the lower side by, for example, the front side frame 7 on the vehicle right side which is disposed below the cover body right-side wall 21 via the radiator sub-tank 63.

Next, the cover body left-side wall 22 will be described in detail mainly with reference to FIGS. 2, 5, and 8. The cover body left-side wall 22 is formed by a left-side wall front portion 22*f* disposed at a region corresponding to substantially a front half of the left side of the engine (the side of the engine on the vehicle left side) in the vehicle front-rear direction, and a left-side wall rear portion 22*r* disposed at a region corresponding to substantially a rear half thereof, and the left-side wall front portion 22*f* and the left-side wall rear portion 22*r* include the outer cover members 4*f* and 4*r* and the thermal insulating members 5*f* and 5*r* (see FIG. 8) disposed at inner faces of the outer cover members 4*f* and 4*r*, respectively.

The outer cover member 4*f* of the left-side wall front portion 22*f* is formed by the high-rigidity portion 43 and a front low-rigidity portion 44 located on the upper side relative to the high-rigidity portion 43 (see FIGS. 2 and 5). The outer cover member 4*r* of the left-side wall rear portion 22*r* is formed by the high-rigidity portion 45 and a rear low-rigidity portion 46 located on the upper side relative to the high-rigidity portion 45 (see FIGS. 2, 5, and 8).

Here, a low-rigidity portion 47 continuous in the vehicle front-rear direction is formed by integrating the front low-rigidity portion 44 provided at an upper edge of the left-side wall front portion 22*f* and the rear low-rigidity portion 46 provided at an upper edge of the left-side wall rear portion 22*r*.

In the cover body left-side wall 22, similarly to the cover body right-side wall 21, the high-rigidity portions 43 and 45 are formed of a PP material, and the low-rigidity portion 47 is formed of an elastomer resin material having lower rigidity than the PP member.

Furthermore, the cover body left-side wall 22 in this example, similarly to the cover body right-side wall 21, includes the thermal insulating members 5*f* and 5*r* having a sound absorbing effect, whereas the thermal insulating members 5*f* and 5*r* are configured to be provided only at inner faces of the high-rigidity portions 43 and 45 of the walls 22*f* and 22*r* on the respective front and rear sides and not provided at an inner face of the low-rigidity portion 47 (see FIG. 8).

However, the present invention, of course, does not exclude a configuration in which the thermal insulating member 5 is provided at the inner face of the low-rigidity portion 47, and, in that case, the thermal insulating member 5 provided at the low-rigidity portion 47 may be formed integrally with the thermal insulating member 5 provided at the high-rigidity portions 43 and 45.

Furthermore, as shown in FIGS. 2 and 5, at an upper end of the left-side wall front portion 22*f* and an intermediate position thereof in the vehicle front-rear direction, an escape portion 22*a* is formed which is recessed in a semi-circular shape downward corresponding to substantially a lower half of the second through portion 37*a*, and this escape portion 22*a* shapes the second through portion 37*a* in substantially a circular shape together with the guide portion 37 projecting in a semi-circular shape upward.

An insertion portion of the air intake hose 62 into the second through portion 37*a* is formed integrally with a seal lip 62*a* formed of an elastic body in a flange shape. This seal lip 62*a* is pressed against a bottom face of the guide portion 37 and a top face of the escape portion 22*a* of the left-side wall front portion 22*f*, and thereby, at the second through portion 37*a*, a gap between the guide portion 37 and the left-side wall front portion 22*f* is closed.

Furthermore, a rear end of the high-rigidity portion 43 of the left-side wall front portion 22*f* and a front end of the high-rigidity portion 45 of the left-side wall rear portion 22r overlap with each other in the vehicle front-rear direction and are connected to each other by a clip at the overlapping portion.

Furthermore, the low-rigidity portion 47 extends in the vehicle front-rear direction from a rear edge of the escape portion 22a of the left-side wall front portion 22f to an intermediate position of the left-side wall rear portion 22r in the vehicle front-rear direction. Namely, the low-rigidity portion 47 is disposed so as to lie across the left-side wall front portion 22f and the left-side wall rear portion 22r (see FIGS. 2 and 5).

In the cover body left-side wall 22, the upper end including the low-rigidity portion 47 supports the lid left-side wall 32 from immediately therebelow via the seal member 71.

In particular, in the left-side wall front portion 22f of the cover body left-side wall 22, at a portion corresponding to the second through portion 37a in the vehicle front-rear direction, the air intake hose 62 inserted through the second through portion 37a intervenes including the seal lip 62a, and thus a configuration in which the guide portion 37 of the lid 3 is supported from immediately therebelow by the air intake hose 62 is adopted.

The guide portion 37 of the lid 3 is thus supported by the air intake hose 62, and thereby the air intake hose 62 having lower rigidity than a PP material as a high-rigidity member (excellent in elasticity in the up-down direction) substitutes for the portion of the left-side wall front portion 22f corresponding to the second through portion 37a in the vehicle front-rear direction without provision of the low-rigidity portion 47 as described above.

Furthermore, as shown in FIG. 3, on the front outer side of the left-side wall front portion 22f, the air cleaner 64 and a fresh air duct 65 as air intake system components are disposed adjacent to each other.

In the left-side wall front portion 22f of the cover body left-side wall 22, the high-rigidity portion 43 located at least therebelow is mounted on the air cleaner 64, and the left-side wall front portion 22f of the cover body left-side wall 22 is supported from the lower side by, for example, the front side frame (illustration omitted) on the vehicle left side which is disposed below the left-side wall front portion 22f via the air cleaner 64.

In the left-side wall rear portion 22r of the cover body left-side wall 22, a rear edge thereof is mounted on a left edge of the cover body rear wall 23 by a clip or the like, and a front edge thereof is mounted on a rear edge of the left-side wall front portion 22f by a clip or the like as described above. Namely, the left-side wall rear portion 22r of the cover body left-side wall 22 is supported from the lower side by, for example, the front side frame (illustration omitted) on the vehicle left side via, for example, the cover body rear wall 23 and the left-side wall front portion 22f.

As shown in FIGS. 1 to 3, the above-described vehicle front structure is a vehicle front structure including, below the bonnet 6, the cover member 1 that covers the engine from the upper portion thereof to the side and is formed by the upper wall 30, the shroud 8 as the front wall, the rear wall 13, and the side walls 11 and 12 on the respective left and right sides, wherein, on the front side of the right-side wall 11, the low-rigidity portion 42 formed of elastomer resin as the low-rigidity member having lower rigidity on the front side than on the rear side is provided (see FIGS. 1, 4, 6, and 7), and, on the front side of the left-side wall 12, the low-rigidity portions 47 (44 and 46) and 62 formed of elastomer resin as the low-rigidity member having lower rigidity on the front side than on the rear side are provided (see FIGS. 2, 5, and 8).

According to the configuration, a shock absorption performance of a front portion of the bonnet 6 is enhanced, and thereby, at the time of collision between the vehicle and a pedestrian, a shock applied from the front portion of the bonnet 6 to the pedestrian who collapses onto the bonnet 6 from above can be reduced, contributing to protection of the pedestrian.

As an aspect of the present invention, the cover member 1 includes the openable and closable lid 3 (opening-closing cover) having the upper wall 30, the lid side walls 31 and 32 (opening-closing side walls) on the respective left and right sides, and the lid rear wall 33 (opening-closing rear wall) (see FIGS. 1 to 3), the side walls 11 and 12 on the respective left and right sides are formed by the lid side walls 31 and 32 on the respective left and right sides and the cover body side walls 21 and 22 (fixed side walls on the respective left and right sides) on the respective left and right sides which, by using the upper ends thereof, support lower ends of the lid side walls 31 and 32 on the respective left and right sides via the seal member 70 (71, 72) (see FIGS. 1, 2, and the like), the rear wall 13 is formed by the lid rear wall 33 (opening-closing rear wall) and the cover body rear wall 23 (fixed rear wall) that rotatably supports the lid rear wall 33 via the hinges 24 (see FIG. 2), and upper-side portions of front portions of the cover body side walls 21 and 22 on the respective left and right sides are formed by the low-rigidity portions 42 and 47 (44, 46) and 62 having lower rigidity than lower-side portions thereof (see FIGS. 1, 2, and the like).

According to the configuration in which the cover member 1 includes the lid 3 openable and closable with respect to the cover body 2 (the cover body side walls 21 and 22 on the respective left and right sides and the cover body rear wall 23) and in which a lower end portion of the lid 3 is supported from the lower side by an upper end portion of the cover body 2 to secure sealing properties between the cover body 2 and the lid 3, the shock absorption performance of the front portion of the bonnet 6 can be improved while securing the rigidity for supporting the lid 3 by the cover body 2.

Specifically, as a cover member provided with a lid openable and closable with respect to a cover body, for example, the cover member in Patent Literature 1 described above (Japanese Patent Laid-Open No. 2017-177966) is disclosed.

This cover member in Patent Literature 1, when the lid is closed, abuts against an upper portion of the cover body from the vehicle side via a seal member.

In this configuration, the lid is not directly accepted and supported from therebelow by the cover body, and thus it becomes easier to allow the downward displacement of the lid due to a shock from above, which can be regarded as a configuration in which a shock absorption performance of a front portion of the bonnet is consequently easily secured; however, there is a concern about rigidity for supporting the lid by the cover body and sealing properties between these both members.

In a case where, different from this configuration, the cover member is structured to use an upper end of the cover body and support a lower end portion of the lid directly from the lower side via the seal member, a pressure from the lid due to its self-weight can be directly accepted by the cover body, and thus it is effective in terms of securing the sealing properties between the lid and the cover body.

In the cover member 1, the whole cover body side walls 21 and 22 (fixed side walls) on the respective left and right sides are not formed by the low-rigidity portions 42 and 47, and the low-rigidity portions 42 and 47 are disposed so that the upper-side portions of the front portions of the cover body side walls 21 and 22 have lower rigidity than the lower-side portions thereof; accordingly, the shock absorption performance of the front portion of the bonnet 6 can be improved while securing the rigidity for supporting the lid 3.

In particular, the low-rigidity portions 42 and 47 are disposed so that the upper-side portions of the front portions of the cover body side walls 21 and 22 (fixed side walls) on the respective left and right sides have lower rigidity than the lower-side portions thereof, and thereby the high-rigidity portion 41 and the outer cover member 4d formed of a high-rigidity member (PP material) can be disposed below the low-rigidity portions 42 and 47. Furthermore, a load applied to the low-rigidity portions 42 and 47 from above is reduced compared with a configuration in which, for example, these low-rigidity portions 42 and 47 and the high-rigidity portion 41 are disposed upside down, and, even at the front portions of the cover body side walls 21 and 22, the rigidity for supporting the lid 3 can be secured as much as possible.

The high-rigidity portions 41, 43, and 45 and the outer cover member 4d are formed of a PP material, the low-rigidity portions 42 and 47 (44, 46) and 62 are formed of, for example, an elastomer resin material or rubber which has lower rigidity than the PP material, the main portion of the cover body right-side wall 21 provided at the right-side wall 11 is formed by the outer cover member 4d and the high-rigidity portion 41, and the front portion of the cover body side wall 21 is configured so as to have a higher ratio of the low-rigidity portion 42 than the rear portion thereof (see FIGS. 1, 4, 6, and 7). Furthermore, the main portion of the cover body left-side wall 22 provided at the left-side wall 12 is formed by the high-rigidity portions 43 and 45, and the front portion of the cover body left-side wall 22 is configured so as to have a higher ratio of the low-rigidity portions 47 (44, 46) and 62 than a rear portion thereof (see FIGS. 2, 5, and 8).

According to the configuration, while basic rigidity of the side walls 11 and 12 is secured by the PP material, rigidity of front portions of the side walls 11 and 12 can be partially reduced by the elastomer resin material.

The outer cover member 4u of the right-side wall upper portion 21u provided at the right-side wall 11 is formed by integrating the high-rigidity portion 41 and the low-rigidity portion 42 (see FIGS. 1, 4, 6, and 7), the outer cover member 4f of the left-side wall front portion 22f provided at the left-side wall 12 is formed by integrating the high-rigidity portion 43 and the front low-rigidity portion 44 (see FIGS. 2 and 5), and the outer cover member 4r of the left-side wall rear portion 22r provided at the left-side wall 12 is formed by integrating the high-rigidity portion 45 and the rear low-rigidity portion 46 (see FIGS. 2, 5, and 8).

According to the configuration, unlike a case where, for example, a side wall formed of a high-rigidity member and a side wall formed of a low-rigidity member are separately formed and then connected to each other, a connecting member and a connecting work are not required, and thus the number of components and the number of assembling steps can be reduced.

The inner wall face side of the outer cover member 4u of the right-side wall upper portion 21u provided at the right-side wall 11 has the thermal insulating member 5u mounted thereon and is formed by integrating the high-rigidity portion 41 and the low-rigidity portion 42 (see FIGS. 1, 4, 6, and 7).

As described above, the right-side wall upper portion 21u is formed by integrating the high-rigidity portion 41 and the low-rigidity portion 42 and thus can be formed in a face shape smoothly continuous between these 41 and 42 substantially without a gap (see the X portion enlarged figure in FIG. 7).

Thus, with respect to the inner wall face side of the right-side wall upper portion 21u formed by integrating the high-rigidity portion 41 and the low-rigidity portion 42, the thermal insulating member 5u can be mounted on each of the upper and lower sides so as to lie across these 41 and 42 without a gap (see FIGS. 6 and 7).

An upper portion of the right-side wall 11 is provided with the first through portion 35a allowing the metal pipe 61 as a vehicle component having higher rigidity than the low-rigidity portion 42 to be inserted therethrough (see FIGS. 1, 4, and 6), and the cover body right-side wall 21 provided below the first through portion 35a in the right-side wall 11 has a higher ratio of the low-rigidity portion 42 than another portion (in particular, a vehicle rear portion) in the vehicle front-rear direction (see FIGS. 1 and 4).

According to the configuration, routing of the metal pipe 61 having high rigidity which lies across the inner and outer sides with respect to the right-side wall 11 of the cover member 1 and the shock absorption performance of the front portion of the bonnet 6 can be both achieved.

An upper portion of the left-side wall 12 is provided with the second through portion 37a allowing the air intake hose 62 as a vehicle component having lower rigidity than the high-rigidity portions 43 and 45 to be inserted therethrough (see FIGS. 2 and 5), and the air intake hose 62 inserted through the second through portion 37a is configured to substitute for the low-rigidity portion 46.

According to the configuration, the air intake hose 62 inserted through the second through portion 37a is in a bellows and hollow shape and is capable of compression deformation (elastic deformation) in the up-down direction with respect to a shock from above, so that the shock absorption performance of the front portion of the bonnet 6 can be improved by using this air intake hose 62.

The technology disclosed herein is not limited to only the above-described configurations and can be formed in various embodiments.

REFERENCE SIGNS LIST 1 cover member
3 lid (opening-closing cover)
5u thermal insulating member
6 bonnet
8 shroud (front wall)
13 rear wall
11, 12 side walls on the respective left and right sides
21, 22 cover body side walls on the respective left and right sides (fixed side walls on the respective left and right sides)
23 cover body rear wall (fixed rear wall)
24 hinge
30 upper wall
31, 32 lid side walls on the respective left and right sides (opening-closing side walls on the respective left and right sides)
33 lid rear wall (opening-closing rear wall)
35a first through portion 37a second through portion
41, 43, 45 high-rigidity portion (high-rigidity member, PP material)
47 (44 and 46), 62 low-rigidity portion (low-rigidity member, elastomer resin material)
42 low-rigidity portion (low-rigidity member)
61 metal pipe (vehicle component having higher rigidity than the low-rigidity member)
62 air intake hose (vehicle component having lower rigidity than the high-rigidity member)
70 (71, 72) seal member

The invention claimed is:

1. A vehicle front structure comprising:
an engine room;
an engine disposed in the engine room;
a bonnet covering an upper side of the engine room in an openable and closable manner; and
a cover member, in the engine room and below the bonnet, covering the engine from an upper portion of the engine to a side peripheral face of the engine, wherein
the cover member comprises an upper wall, a front wall, a rear wall, and side walls on respective left and right sides,
a front side of one of the left and right side walls has, relative to a rear side of the one of the left and right side walls, a higher ratio of a low-rigidity member having lower rigidity than a high-rigidity member forming a main portion on the rear side,
the cover member comprises an openable and closable opening-closing cover having the upper wall, opening-closing side walls on respective left and right sides, and an opening-closing rear wall,
the side walls on the respective left and right sides comprise the opening-closing side walls on the respective left and right sides and fixed side walls on respective left and right sides, upper ends of the fixed side walls supporting lower ends of the opening-closing side walls on the respective left and right sides via a seal member,
the rear wall comprises the opening-closing rear wall and a fixed rear wall rotatably supporting the opening-closing rear wall via a hinge,
a front portion of each fixed side wall comprises the high-rigidity member and the low-rigidity member provided on an upper side relative to the high-rigidity member,
the high-rigidity member is formed of a PP material, and the low-rigidity member is formed of an elastomer resin material having lower rigidity than the PP material,
a main portion of the side wall comprises the high-rigidity member, and a front portion of the side wall has a higher ratio of the low-rigidity member than a rear portion of the side wall, and
the side wall is formed by integrating the high-rigidity member and the low-rigidity member.

2. The vehicle front structure according to claim 1, wherein
a thermal insulating member is mounted on an inner wall face side of the side wall.

3. The vehicle front structure according to claim 2, wherein
an upper portion of the side wall is provided with a first through portion allowing a vehicle component having higher rigidity than the low-rigidity member to be inserted through the first through portion, and a lower side of the first through portion in the side wall has a higher ratio of the low-rigidity member than another portion.

4. The vehicle front structure according to claim 3, wherein
an upper portion of the side wall is provided with a second through portion allowing a vehicle component having lower rigidity than the high-rigidity member to be inserted through the second through portion, and
the vehicle component inserted through the second through portion substitutes for the low-rigidity member.

5. The vehicle front structure according to claim 4, wherein
the vehicle component inserted through the second through portion is an air intake hose in a bellows shape.

6. The vehicle front structure according to claim 1, wherein
an upper portion of the side wall is provided with a first through portion allowing a vehicle component having higher rigidity than the low-rigidity member to be inserted through the first through portion, and a lower side of the first through portion in the side wall has a higher ratio of the low-rigidity member than another portion.

7. The vehicle front structure according to claim 6, wherein
an upper portion of the side wall is provided with a second through portion allowing a vehicle component having lower rigidity than the high-rigidity member to be inserted through the second through portion, and
the vehicle component inserted through the second through portion substitutes for the low-rigidity member.

8. The vehicle front structure according to claim 1, wherein
an upper portion of the side wall is provided with a second through portion allowing a vehicle component having lower rigidity than the high-rigidity member to be inserted through the second through portion, and
the vehicle component inserted through the second through portion substitutes for the low-rigidity member.

9. The vehicle front structure according to claim 8, wherein
the vehicle component inserted through the second through portion is an air intake hose in a bellows shape.

* * * * *